Aug. 23, 1938.  L. E. LA BRIE  2,127,741

BRAKE

Original Filed Nov. 22, 1930  2 Sheets-Sheet 1

INVENTOR
LUDGER E. LaBRIE
BY Jerome R. Cox
ATTORNEY.

Aug. 23, 1938.  L. E. LA BRIE  2,127,741
BRAKE
Original Filed Nov. 22, 1930  2 Sheets-Sheet 2
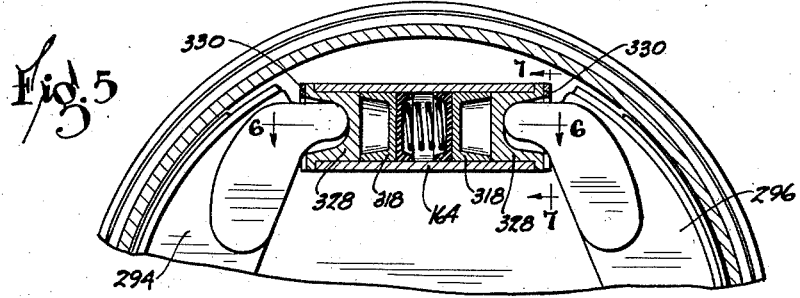
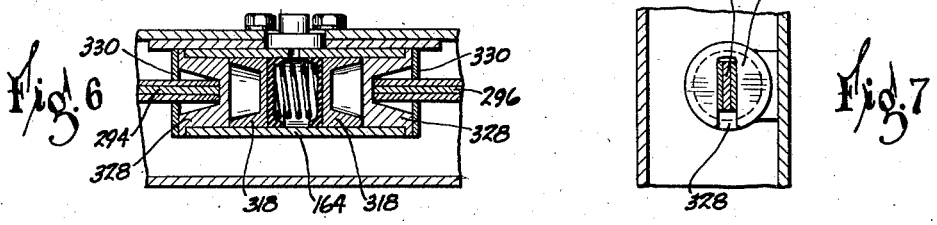
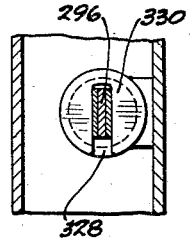
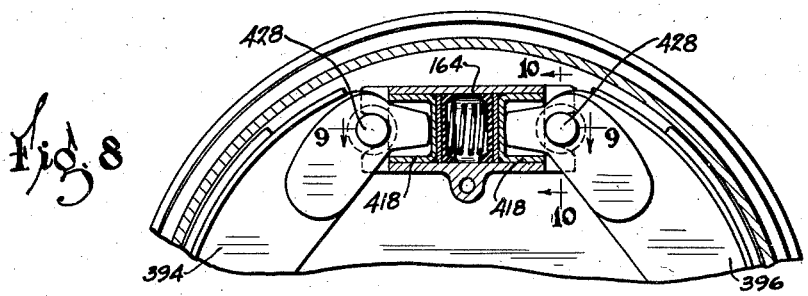
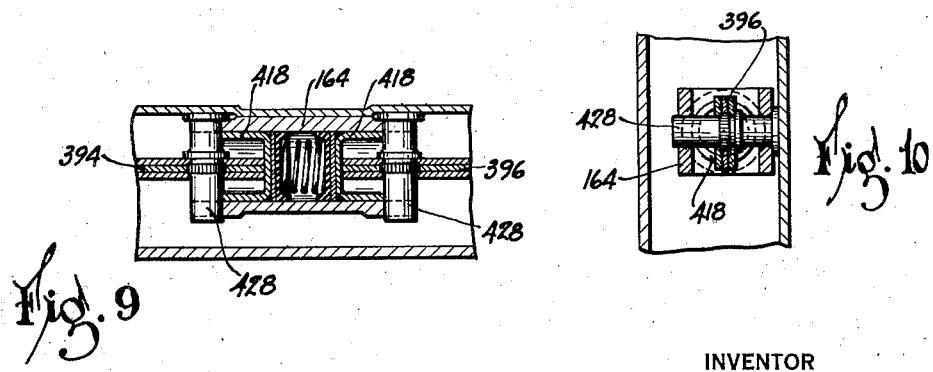
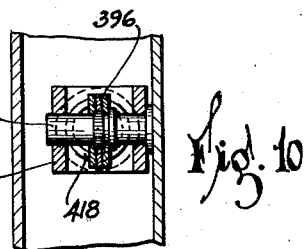
INVENTOR
LUDGER E. LABRIE
BY Jerome R. Cox
ATTORNEY.

Patented Aug. 23, 1938

2,127,741

UNITED STATES PATENT OFFICE 2,127,741

BRAKE

Ludger E. La Brie, Detroit, Mich., assignor to Bendix Brake Company, South Bend, Ind., a corporation of Illinois Original application November 22, 1930, Serial No. 497,383. Divided and this application July 30, 1936, Serial No. 93,447

2 Claims. (Cl. 188—152)

This invention relates to brakes, and is illustrated as embodied in a novel system of hydraulic brakes for an automobile.

An object of the invention is to provide a brake anchoring on the wheel cylinder but without transmitting any of the anchorage torque to or through the brake-applying pistons.

One feature of the invention relates to the construction and arrangement of the parts of the brake proper, to permit use of a powerful shiftable-anchorage type of brake.

Another feature of the invention relates to the construction of the wheel cylinders, several forms being shown.

The above and other objects and features of the invention, including various novel and desirable details of construction, will be apparent from the following description of the illustrative embodiments shown in the accompanying drawings, in which:

Figure 5 is a partial section corresponding to the upper part of Figure 2 and showing a modified form of applying and anchoring means;

Figure 6 is a section through the modified form of anchoring and applying means on the line 6—6 of Figure 5;

Figure 7 is a partial section on the line 7—7 of Figure 5 and showing the anchoring and applying means in side elevation;

Figure 8 is a partial vertical section corresponding to Figures 2 and 5 and illustrating a third form of anchoring and applying means;

Figure 9 is a section through the third form of anchoring and applying means on the line 9—9 of Figure 8; and Figure 10 is a partial section on the line 10—10 of Figure 8 showing the means for anchoring the brake shoe on the end of the wheel cylinder.

Figure 1:
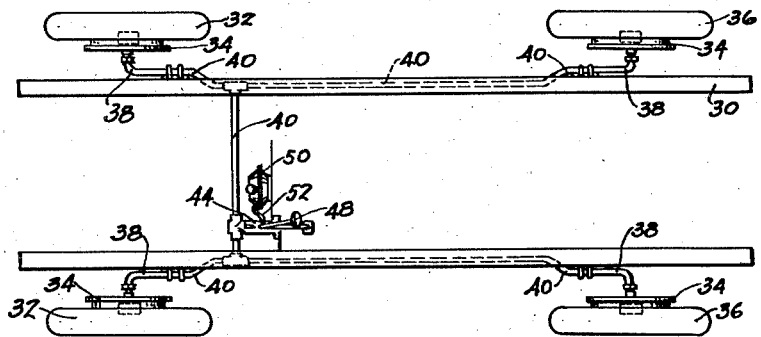
Figure 1 is a top plan view of part of an automobile chassis showing the arrangement of the parts of a system of hydraulic brakes.

The chassis shown in Figure 1 includes the usual chassis frame 30 supported by the usual springs on front and rear axles (not shown) carried by front wheels 32 having brakes indicated generally at 34 and on rear wheels 36 having brakes indicated generally at 34. The brakes 34 may be substantially as more fully described below and as illustrated in Figures 2 to 10.

The brakes are intended to be operated by a hydraulic system including flexible hose connections 38 adjacent the four wheels and communicating by suitable pipes 40 carried by the chassis frame 30 with the outlet of a master cylinder assembly 44 which contains an operating piston connected by a piston rod with the usual brake pedal 48. The hydraulic system is kept full of liquid by means of a reservoir 50 which is mounted on the dash above the master cylinder and on the opposite side of the dash from the driver. The reservoir 50 is connected to the master cylinder 44 by means such as a flexible conduit 52.

Figure 2:
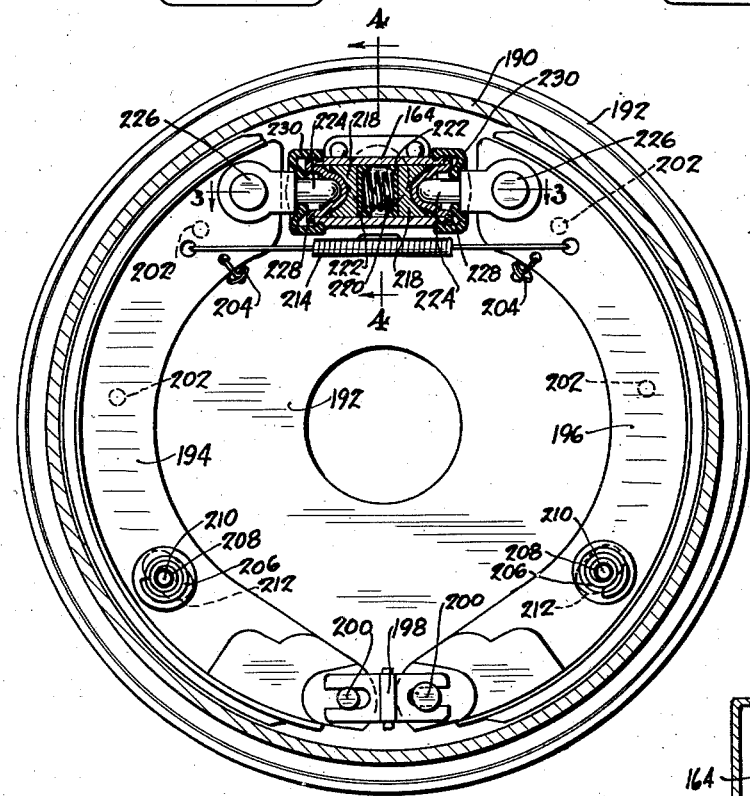
Figure 2 is a vertical section through one of the brakes just inside the head of the brake drum and showing the friction means of the brake in side elevation.
Figure 4:
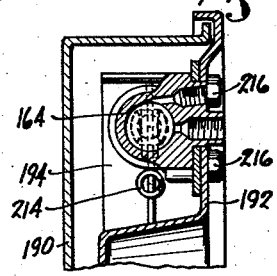
Figure 4 is a transverse section through the wheel cylinder of Figure 2 on the line 4—4 of Figure 2.
Figure 3:
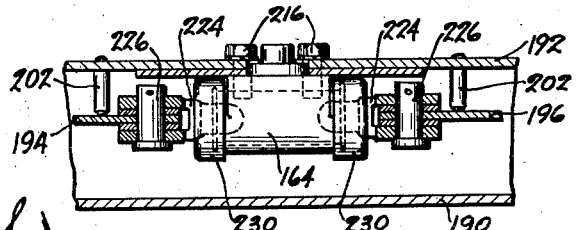
Figure 3 is a section on the line 3—3 of Figure 2 and showing the mounting of the end parts of the brake shoes or their equivalents and how these parts engage the applying means.

The brake shown in Figures 2 to 4 includes a rotatable drum 190, at the open side of which is arranged a suitable support such as a backing plate 192 and within which is arranged the friction means of the brake. I prefer to utilize a brake of the shiftable-anchorage type, which may embody floating friction means shown as including a pair of shoes 194 and 196 connected by a suitable adjustment such as an expansible joint 198 of any desired form connected to the lower ends of the shoes by pivots 200. The shoes may be positioned by means such as steady rest pins 202 carried by the backing plate and engaging the webs of the shoes and against which the webs of the shoes are urged by means such as springs 204 tensioned between the shoe webs and backing plate and conical springs 206 confined between the shoe webs and nuts or other stops 208 on the ends of steady rest pins 210 carried by the backing plate and passing through relatively large openings 212 in the shoe webs.

The particular brake shown in Figure 2 is applied, against the resistance of a return spring 214 tensioned between the shoes, by novel means which includes the above-described wheel cylinder 164 which is attached to the backing plate by means such as screws 216, as shown in Figures 3 and 4.

Within the cylinder 164 are a pair of floating opposed pistons 218, against the heads of which a spring 220 holds a pair of rubber sealing cups 222. The floating pistons act to apply the brake in such a manner that one or the other of the shoes may anchor by engagement of one of the thrust members 224 connected to the ends of the shoes by pivots 226. The pivoted thrust members 226 engage anchor cups 228 which are arranged to transmit the brake applying force from the floating pistons 218 to the thrust members 224 and the bases of which also anchor against the ends of the cylinder so that the braking torque is taken from one or the other of the thrust members 224 against cylinder 164 without acting on the pistons 218. Suitable boots 230 of rubber or the like may, if desired, be provided to close the ends of the cylinder 164 and house the above-described anchoring and applying parts.

In the arrangement of Figures 5 to 7, the shoes 294 and 296 are arranged with reinforced rounded projections at their ends for direct engagement with two anchoring parts in the form of auxiliary pistons 328 engaged by the skirts of the floating pistons 318 corresponding to the above-described pistons 218 and the brake of Figure 2. Caps 330 may be mounted over the ends of the pistons, if desired, to house in as much as possible of the operating parts. In this arrangement, one or the other of the shoes 294 or 296 anchors through the medium of one of the auxiliary pistons 328 against one or the other of the ends of the cylinder 164.

In the arrangement of Figures 8 to 10, the shoes 394 and 396 are formed with reinforced rounded projections at their ends in direct engagement with the floating operating pistons 418. The torque of the brake in this case is transmitted to the ends of the cylinder 164 by means such as transverse anchor pins 428 seated in the ends of the shoes and preferably mounted there permanently by having narrow center portions which are forced into the webs of the shoes as far as permitted by flanges on the ends which engage the sides of the webs. The transverse anchor pins 428 seat in correspondingly shaped notches in flanges integrally formed in the ends of the cylinder 164.

In all three of these embodiments, the brake is arranged to anchor at one end when the vehicle is moving forward and at the other end when the vehicle is moving backward so that the entire friction device consisting of the two adjustably and pivotally connected shoes or their equivalents will be effective no matter which way the vehicle is moving and no matter which way the brake drums are turning.

While a number of illustrative embodiments of the invention have been described in detail, it is not my intention to limit its scope to these particular embodiments or otherwise than by the terms of the appended claims.

The present application is a division of my application Serial No. 497,383, filed November 22, 1930.

I claim:

1. A brake comprising friction means having adjacent ends, a cylinder between said adjacent ends having transversely-notched ends and containing applying means acting on the friction means, and transverse anchor pins carried by the ends of the friction means and seated in the notches in the ends of the cylinder, said ends of the friction means having rigid extensions projecting beyond the anchor pins into the opposite ends of the cylinder and directly engaged by said applying means in the cylinder.

2. A brake comprising friction means having adjacent ends, a cylinder between said adjacent ends containing applying means acting on the friction means, and transverse anchor pins carried by the ends of the friction means and seated against the cylinder, said ends of the friction means having rigid extensions projecting beyond the anchor pins into the opposite ends of the cylinder and directly engaged by said applying means in the cylinder.

LUDGER E. LA BRIE.